(12) United States Patent
Collings et al.

(10) Patent No.: US 6,724,994 B1
(45) Date of Patent: Apr. 20, 2004

(54) HYBRID TDM/WDM DEMULTIPLEXING IN LOW DUTY CYCLE OPTICAL TRANSMISSION SYSTEMS

(75) Inventors: Brandon C. Collings, Middletown, NJ (US); Howard R. Stuart, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 565 days.

(21) Appl. No.: 09/672,203

(22) Filed: Sep. 28, 2000

(51) Int. Cl.[7] .................................................. H04J 4/00
(52) U.S. Cl. .............................. 398/75; 398/74; 398/91
(58) Field of Search ........................... 398/74, 75, 91, 398/102

(56) References Cited

U.S. PATENT DOCUMENTS

| | | | | |
|---|---|---|---|---|
| 5,208,691 A | * | 5/1993 | Nishio | ........................ 398/46 |
| 5,589,967 A | | 12/1996 | Auffret | ........................ 359/123 |
| 5,654,812 A | | 8/1997 | Suzuki | ........................ 359/139 |
| 5,938,309 A | * | 8/1999 | Taylor | ........................ 398/79 |
| 5,953,138 A | | 9/1999 | Ellis | ........................ 359/123 |
| 5,959,750 A | | 9/1999 | Eskildsen et al. | ........... 359/134 |
| 6,023,360 A | | 2/2000 | Morioka et al. | ............ 359/123 |
| 6,256,124 B1 | * | 7/2001 | Hait | ........................ 398/9 |
| 6,449,069 B1 | * | 9/2002 | Fujita | ........................ 398/75 |

OTHER PUBLICATIONS

A 1021 Channel WDM System, Brandon C. Collings, Matthew L. Mitchell, Luc Boivin and Wayne H. Knox, Ieee Photonics Technology Letters, vol. 12, No. 7, Jul. 2000.

* cited by examiner

*Primary Examiner*—Kinfe-Michael Negash (57) ABSTRACT

A method and apparatus for preparing groups of low duty cycle WDM transmission channels such that each group can be demultiplexed either via conventional WDM (e.g., by optically filtering each channel and receiving that channel at its line rate) or via TDM (e.g., directing an entire group of WDM channels onto a signal higher speed detector, receiving them all and demultiplexing the channels in a temporal (electronic) domain).

31 Claims, 7 Drawing Sheets

HYBRID TDM/WDM DEMULTIPLEXING IN LOW DUTY CYCLE OPTICAL TRANSMISSION SYSTEMS

TECHNICAL FIELD

The invention relates to the field of communications systems and, more specifically, to a method and apparatus of forming and demultiplexing a very high density WDM signal.

BACKGROUND OF THE INVENTION

Within the context of a high density wave division multiplex (WDM) access system, the cost and efficacy of passive WDM demultiplexers capable of retrieving desired multiplexed WDM streams as substreams becomes prohibitive. For example, consider a thousand channels where each channel operates at 50 Mbits/sec to produce an aggregate bit rate of 50 Gbits/sec. This may not be practical. In the case of a pure time division multiplex (TDM) system, each of a respective one thousand receivers would require a 50 gigabit per second TDM demultiplexer. In the case of a pure WDM version of the system, very close channel spacing is required and large numbers of wavelength demultiplexers capable of separating such very closely spaced channels (approximately 10 GHz) are required. Such a WDM system also may not be very practical.

It is therefore seen to be desirable to provide a hybrid WDM/TDM demultiplexing system suitable for use in a high density WDM system. More particularly, it is seen to be desirable to provide such a hybrid TDM/WDM demultiplexing system within a chirped pulse WDM system (CPWDM).

SUMMARY OF THE INVENTION

The invention comprises a method and apparatus for preparing groups of low duty cycle WDM transmission channels such that each group can be demultiplexed either via conventional WDM (e.g., by optically filtering each channel and receiving that channel at its line rate) or via TDM (e.g., directing an entire group of WDM channels onto a signal higher speed detector, receiving them all and demultiplexing the channels in a temporal (electronic) domain). The invention provides several advantages; namely, the replacement of high cost, very fine optical demultiplexers with cheaper electronic demultiplexers, straight forward implementation of various bit rate or scalable delivery per user (e.g., delivery of a single optical channel at channel rate and/or TDM delivery of N channels at a rate of N times the channel rate), and a direct path to higher channel count upgradability. These advantages may be simultaneously obtained using a transmitter formed according to the teachings of the present invention. Advantageously, the invention also enables a flexible bandwidth allocation scheme in which customer bandwidth requirements may be easily scaled up (or down) by the proper selection of optical filters at respective customer receivers.

The invention comprises a method and apparatus for demultiplexing a high density wave division multiplex (WDM) signal using coarse WDM passive demultiplexing elements and electronic time division multiplexing (TDM) demultiplexing elements. In this manner, the WDM nature of the transmission network is fully maintained and easily upgraded with finer WDM demultiplexers as desired. Additionally, the invention scales to accommodate various bandwidth users or multiple bandwidth users. A dual WDM/TDM demultiplexer may be simultaneously employed within the context of the present invention.

BRIEF DESCRIPTION OF THE DRAWINGS

The teachings of the present invention can be readily understood by considering the following detailed description in conjunction with the accompanying drawing in which.

To facilitate understanding, identical reference numerals have been used, where possible, to designate identical elements that are common to the figures.

DETAILED DESCRIPTION OF THE INVENTION

The invention will be described within the context of a hybrid time division multiplexing (TDM)/wave division multiplexing (WDM) communications system in which a very high density (WDM) signal is formed and processed. While several embodiments will be disclosed and described in more detail herein, including a chirped pulse wave division multiplex (CPWDM) system, it will be appreciated by those skilled in the art and informed by the teachings of the present invention that any system utilizing low duty cycle WDM channels may advantageously employ the present invention.

Figure 1:
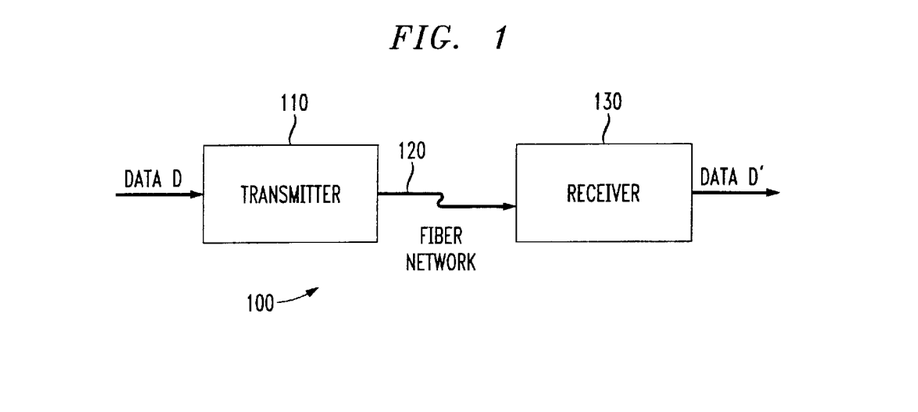
FIG. 1 depicts a high level block diagram of a communication system including the present invention.

FIG. 1 depicts a high level block diagram of a communications system. The communications system 100 of FIG. 1 comprises a transmitter 110, a fiber network 120 and a receiver 130. Exemplary embodiments of the transmitter 110 will be described in more detail below with respect to FIGS. 3 and 5. Similarly, an exemplary embodiment of the receiver 130 will be described in more detail below with respect to FIG. 4.

Briefly, the transmitter 110 receives a data signal D. The transmitter generates M wave division multiplex (WDM) channels, where each channel is spaced by $\Delta\lambda$ and has a maximum per channel bit rate of f. It is noted that the duty cycle of these channels is less than $$\frac{1}{N},$$

where N is the number of channels to be grouped together and optically demultiplexed using a coarse optical demultiplexer within the receiver 130. It is noted that adjacent channels of each grouping are offset in time by an integer multiple of $$\frac{1}{Nf}.$$

The fiber network or distribution network 120 comprises a standard fiber network in which the temporal spreading of a block of N channels must be less than the aggregated bit period, as described by the following equation:

$$\frac{1}{Nf} \gg \Delta\lambda \cdot N \cdot D \cdot L \qquad \text{(eq. 1)}$$

where D·L=total GVD of fiber network.

The receiver 130 will be described in more detail below with respect to FIG. 4. Briefly, the receiver 130 comprises an optical-to-electrical (O/E) photodetector having a bandwidth $Mf_1$, (where M is the number of wavelengths provided to the detector) and the necessary clock recovery and decision circuitry. The optical bandwidth of the photodetector must span the full bandwidth of the N channels to be received. The electrical output of the photodetector comprises a bit-interleaved TDM stream of the N channels. It is noted that different receivers with different bandwidths may be implemented by providing photodetectors (or other optical filtering elements) that pass different optical bandwidths (i.e., M may be increased or decreased). It is noted that M is preferably selected to cause scalable bandwidth to be delivered as periodically repeated wavelength groups. For example, in one embodiment of the invention, M is selected from the set of 1, 2, 4, 8 etc. (i.e., $2^{Mth}$ power is less than or equal to N). Alternatively, M may be limited to 1, 3, 9, etc. (i.e., $3^M$ is less than or equal to N). Broadly speaking, M may be limited to any number satisfying the equation $X^M$ is less than or equal to N, where X is an integer. Such selections of M are made to cause a periodic repetition of the information delivered by the passed grouped channels at the receiver.

Figure 2:
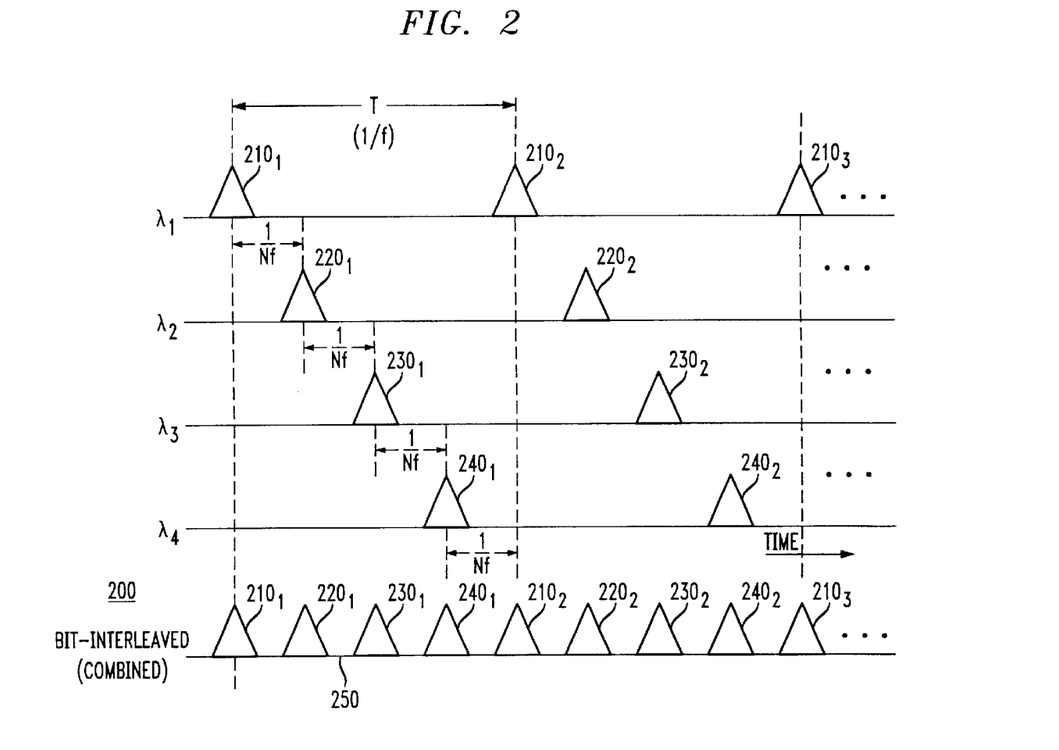
FIG. 2 depicts a graphical representation useful in understanding the present invention.
Figure 3:
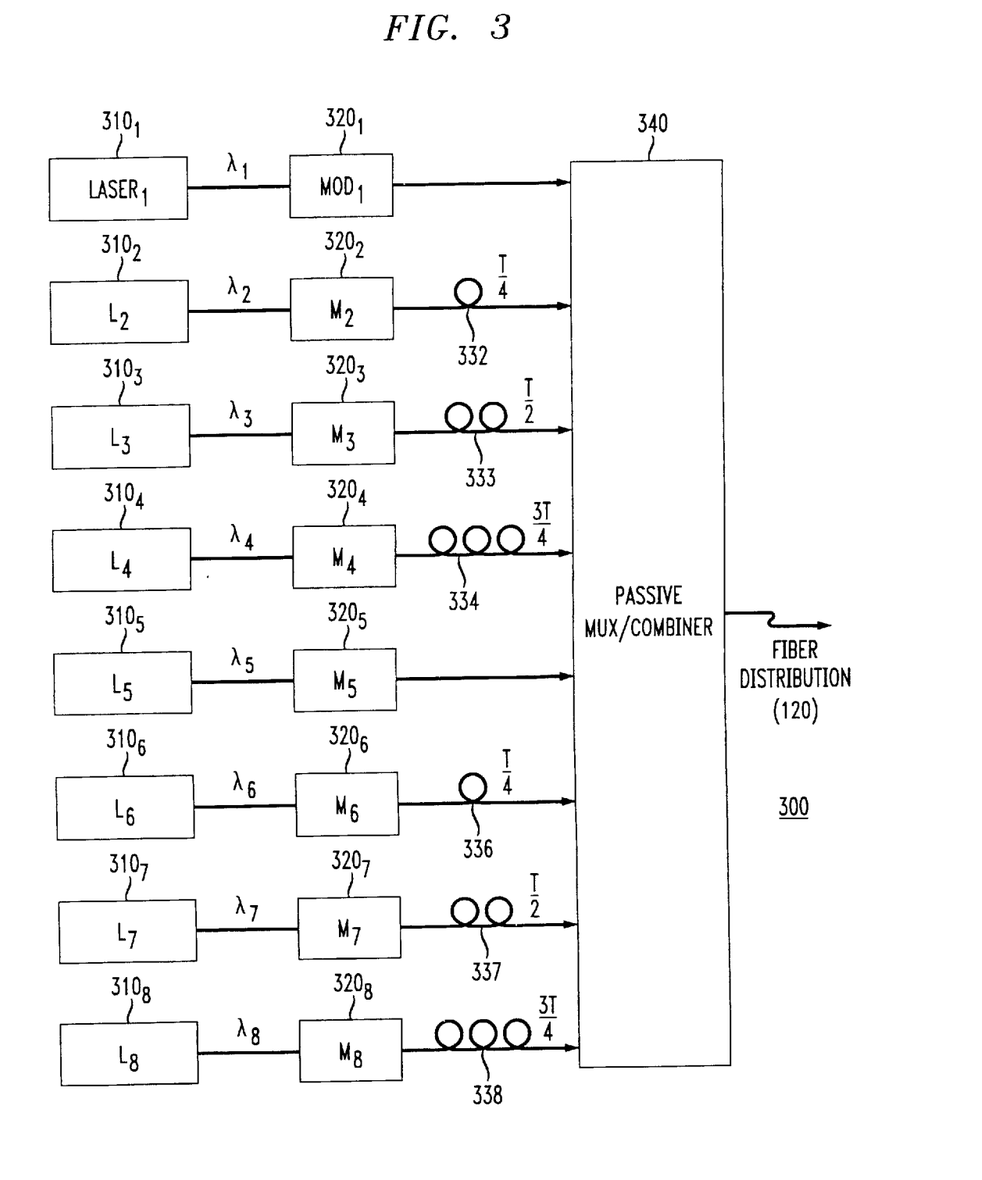
FIG. 3 depicts a high level block diagram of a transmitter suitable for use in the system of FIG. 1.
Figure 5:
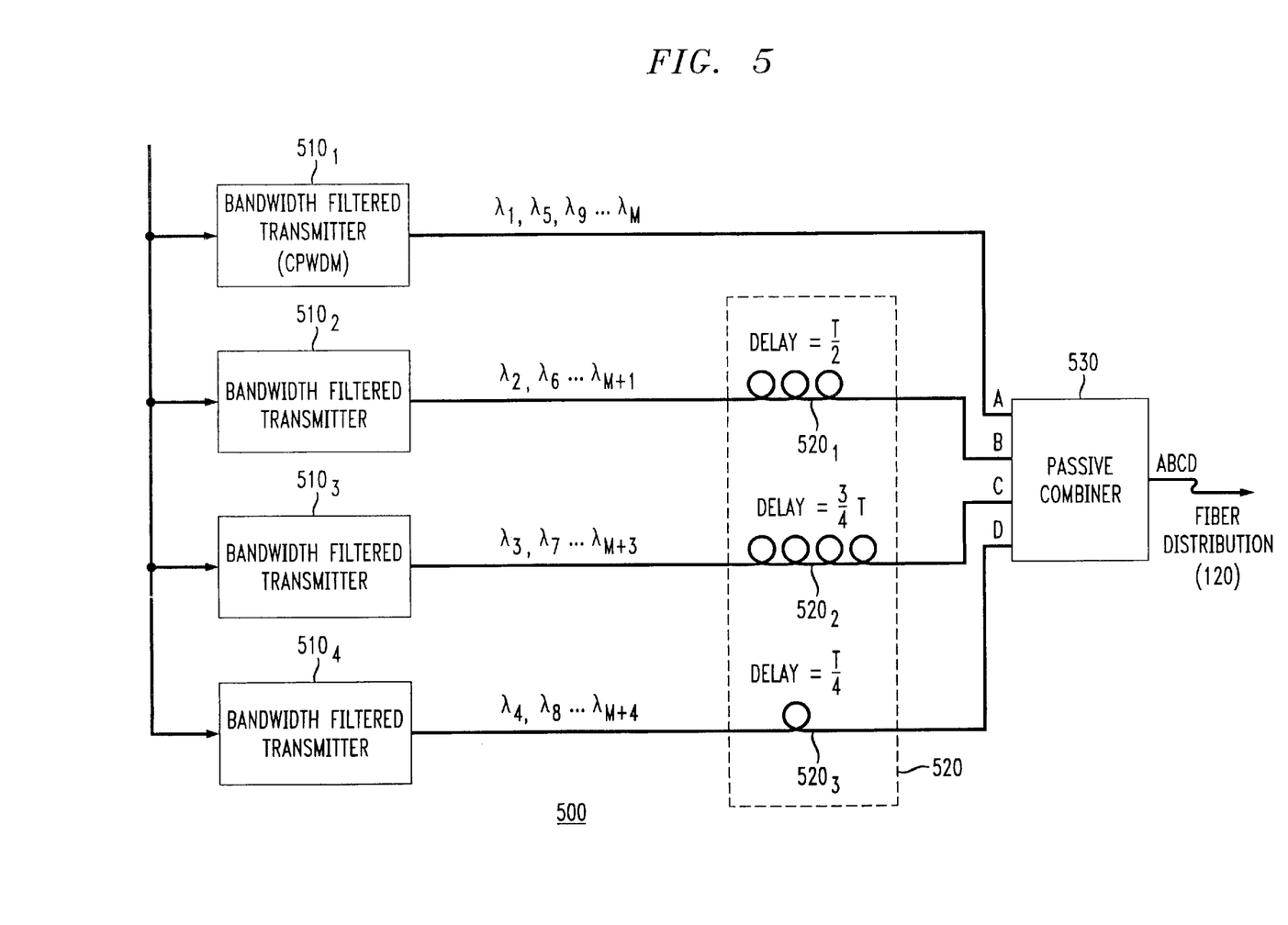
FIG. 5 depicts a high level block diagram of an embodiment of a transmitter suitable for use in the system of FIG. 1.

FIG. 2 depicts a graphical representation useful in understanding the present invention. Specifically, FIG. 2 depicts the temporal location of data on four WDM channels. FIG. 2 depicts a graphical representation of N WDM channels arranged in a time division multiplexed (TDM) manner, where N=4 in this instance. It will be appreciated that N may be a very large number. Transmitters capable of producing groups of WDM channels arranged in the time division multiplexed manner of FIG. 2 will be discussed in more detail with respect to FIGS. 3 and 5. Briefly, each of the N WDM channels to be included within a group is temporally offset from a preceding WDM channel by an amount of time equal to $$\frac{1}{Nf},$$

where $$\frac{1}{f}$$

is the time displacement between consecutive bit positions of a single WDM channel. It will be appreciated by those skilled in the art that the duty cycle of each of the WDM channels must be less than $$\frac{1}{N}$$

and that the number of WDM channels N to be included within a group is constrained by the data rate of the channels and the line rate of the transmission medium.

A first WDM channel $\lambda_1$ provides data at a first bit position $210_1$, a second bit position $210_2$, a third bit position $210_3$ and so on (collectively $\lambda_1$ bit positions 210). A second WDM channel $\lambda_2$ provides data at a first bit position $220_1$, a second bit position $220_2$ and so on (collectively $\lambda_2$ bit positions 220). A third WDM channel $\lambda_3$ provides data at a first bit position $230_1$, a second bit position $230_2$ and so on (collectively $\lambda_3$ bit positions 230). A fourth WDM channel $\lambda_1$ provides data at a first bit position $240_1$, a second bit position $240_2$ and so on (collectively $\lambda_4$ bit positions 240).

Each of four of the WDM channels $\lambda_1$ through $\lambda_4$ are separated by a wavelength $\Delta\lambda$. A period T separates consecutive bit positions within each respective WDM channel.

The $\lambda_2$ bit positions 220 are offset in time from the $\lambda_1$ bit positions 210 by $$\frac{1}{Nf}.$$

The $\lambda_3$ bit positions 230 are offset in time from the $\lambda_2$ bit positions 220 by $$\frac{1}{Nf}.$$

The $\lambda_1$ bit positions 240 are offset in time from the $\lambda_3$ bit positions 230 by $$\frac{1}{Nf}.$$

Finally, the $\lambda_1$ bit positions 210 are offset in time from the $\lambda_4$ bit positions 240 by $$\frac{1}{Nf}.$$

In a graphical representation of FIG. 2, it is noted that N=4. To provide an increased number of WDM channels, N may be increased as desired.

FIG. 2 represents the temporal arrangements of four WDM channels $\lambda_1$ through $\lambda_4$ arranged as a group. A plurality of such groups may be combined and transmitted to a receiver via a single optical fiber. For example, hundreds of groups, each having N WDM channels, may be multiplexed together and transmitted via the single optical fiber. At a receiver, the groups of WDM channels may be individually demultiplexed (as respective groups of WDM channels) using relatively inexpensive coarse optical passive demultiplexers. That is, an optical demultiplexer may be implemented in a cost effective manner to retrieve a single group comprising N WDM channels. Each of the N WDM channels within a demultiplexed group may then be retrieved, either individually or in various combinations, using an electronic or optical TDM multiplexer.

Referring now to FIG. 2, a bit-interleaved or combined stream 250 is also depicted. The bit-interleaved stream 250 comprises the temporal summation of the various bit positions associated with the WDM channels ($\lambda_1$–$\lambda_4$) forming a group where N=4.

FIG. 3 depicts a high level block diagram of a transmitter suitable for use in the system of FIG. 1. Specifically, FIG. 3 depicts a high level block diagram of a transmitter for processing eight WDM channels $\lambda_1$ through $\lambda_8$ to form two groups of WDM channels where each group has four WDM channels (i.e., N=4). It will be appreciated by those skilled in the art that while FIG. 3 is described with respect to eight WDM channels forming two groups, many more (or less) WDM channels may be used (i.e., N may be varied) to form each of a large or small number of groups.

Referring to FIG. 3, each of, illustratively, eight lasers $310_1$ through $310_8$ (collectively lasers 310) produces respective optical signals having respective wavelengths $\lambda_1$ through $\lambda_8$. Each of eight corresponding modulators $320_1$ through $320_8$ (collectively modulators 320) modulates a respective data stream (not shown) onto a received optical signal to produce a respective output signal. The modulator output signals are provided to a passive multiplexer/combiner 340 either directly or with some amount of delay. The modulators 320 preferably comprise return to zero RZ modulators.

In the embodiment 300 of FIG. 3, the output signals of the first $320_1$ and fifth $320_5$ modulators are passed directly to the passive mux/combiner 340. The output signals of the second $320_2$ and sixth $320_6$ modulators are subjected to delays of $$\frac{T}{4}$$

by, respectively, delay loops 332 and 336 (e.g., fiberoptic delay loops or other delay means) and then provided to the passive mux/combiner 340. The outputs of the third $320_3$ and seventh $320_7$ modulators are subjected to $$\frac{T}{2}$$

delays by, respectively, delay loops 333 and 337 and then provided to the passive mux/combiner 340. The outputs of the fourth $320_4$ and eighth $320_8$ modulators are subjected to respective $$\frac{3T}{4}$$

delays by, respectively, delay loops 334 and 338 and then provided to the passive mux/combiner 340. In this manner, the temporal offsets necessary to form two (N=4) groups are provided.

The passive mux/combiner 340 combines the eight WDM channels for transmission via a fiber distribution network 120. The output of the passive mux/combiner 340 comprises eight WDM channels arranged in two groups, where each group substantially corresponds to the graphical depiction of an N=4 group described above with respect to FIG. 2. In the case of the two groups generated by the transmitter 300 of FIG. 3, it is noted that the bit positions of the $\lambda_1$ and $\lambda_5$ WDM channels substantially temporally align, the bit position of the $\lambda_2$ through $\lambda_6$ WDM channels substantially temporally align, the bit positions of the $\lambda_3$ and $\lambda_7$ WDM channels substantially temporally align and the bit positions of the $\lambda_4$ through $\lambda_8$ WDM channels substantially temporally align. By filtering in either the time domain or the frequency domain, non-desired bit positions may be excluded from an output stream to be demultiplexed at a receiver. Such filtering may be provided at the receiver.

Figure 4:
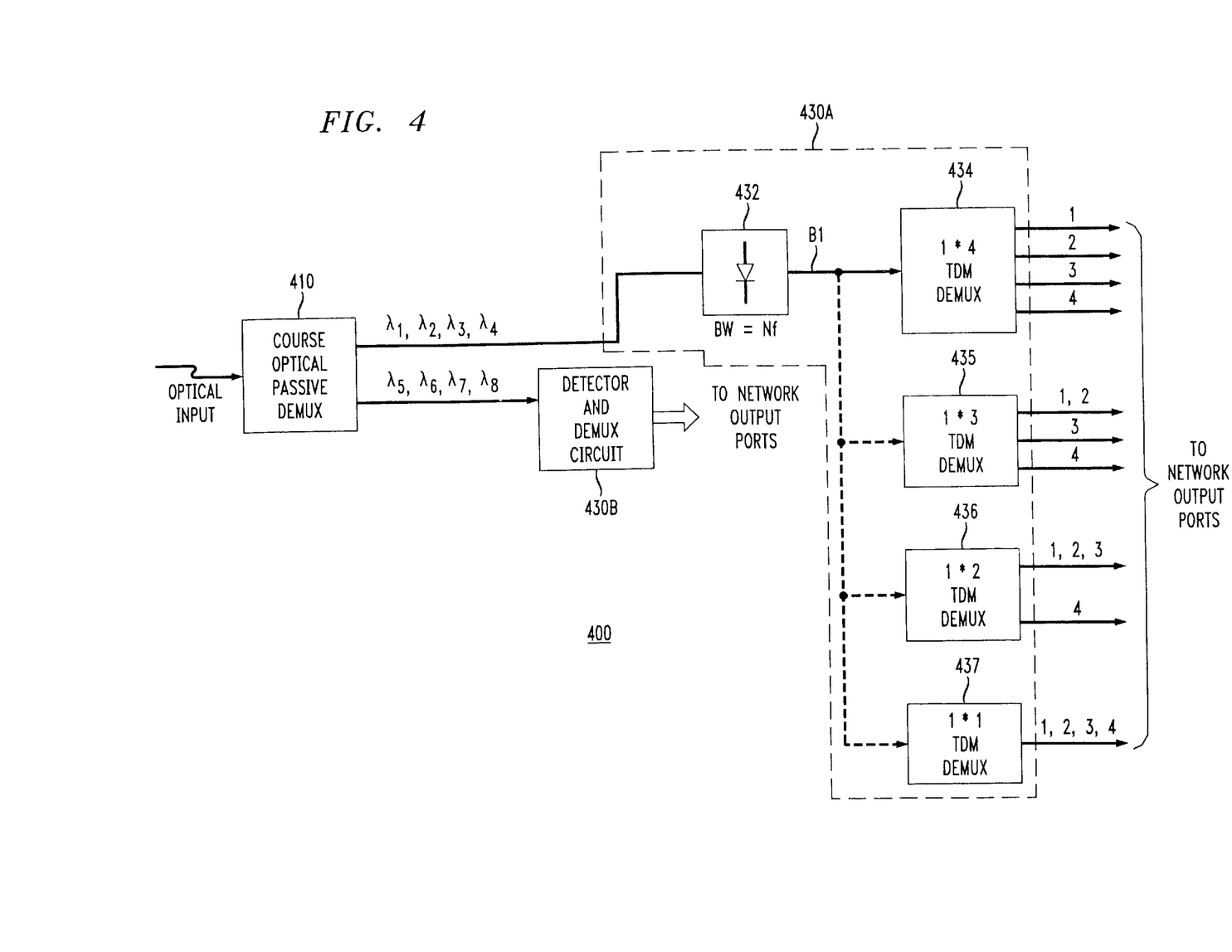
FIG. 4 depicts a high level block diagram of a receiver suitable for use in the system of FIG. 1.

FIG. 4 depicts a high level block diagram of a receiver suitable for use in the system of FIG. 1. The receiver 400 of FIG. 4 receives an input signal (OPTICAL INPUT) from a fiber network (e.g., fiber network 120 of FIG. 1) comprising a plurality of low duty cycle WDM transmission channels, arranged as respective groups in a TDM manner, as previously discussed. In the receiver 400 of FIG. 4, it is assumed that eight WDM channels (denoted as $\lambda_1$ through $\lambda_8$) are arranged as two groups of time division multiplexed WDM channels, where N=4 for each group. That is, it is assumed that the receiver 400 of FIG. 4 receives an optical stream such as produced by, for example, the transmitter 350 described above with respect to FIG. 3. The first group comprises WDM channels as $\lambda_1$ through $\lambda_4$ while the second group comprises channels $\lambda_5$ through $\lambda_8$.

A coarse optical passive demultiplexer 410 performs a coarse optical demultiplexing operation on the input signal OPTICAL INPUT to extract the first group of WDM channels ($\lambda_1$ through $\lambda_4$) at a first output, and the second group of WDM channels ($\lambda_5$ through $\lambda_8$) at a second output. The first group of WDM channels is coupled to a first detector and demultiplexer circuit 430A, while the second group of WDM channels is coupled to a second detector and demultiplexer circuit 430B. Since the first 430A and second 430B detector and demultiplexer circuits operates in substantially the same manner, only the operation of the first 430A detector and demultiplexer circuit will be described in detail. The second 430B detector and demultiplexer circuit operates in substantially the same manner with respect to the second group of WDM channels as the first detector and demultiplexer circuit 430A operates on the first group of WDM channels.

It is important to note that the coarse optical passive demultiplexer 410 may be implemented in a relatively cost effective manner because the bandwidth associated with an entire group of WDM channels is passed. In this manner, the expense and precision of passing only a single WDM channel via an optical filter is avoided. Thus, relatively simple topologies may be used to implement the demultiplexer 410.

The first detector and demultiplexer circuit 430A comprises an optical to electrical (O/E) photodetector 432 having a bandwidth equal to N×f and the necessary clock recovery and decision circuitry (not shown) for selectively filtering out frequency components not associated with the first group of WDM channels ($\lambda_1$ through $\lambda_4$). It is noted that the optical bandwidth BW of the photo detector 432 must span the full bandwidth of the N channels to be processed. In the exemplary embodiment of FIG. 4, the first group comprises four channels (i.e., N=4). The photodetector 432 produces at an output an electrical signal comprising a bit-interleaved time division multiplexed (TDM) stream (BI) of the N channels within the first group. In the exemplary embodiment of FIG. 4, the output of photodetector 432 comprises a bit-interleaved TDM stream comprising the $\lambda_1,\lambda_2,\lambda_3,\lambda_4$ WDM channels, such as bit-interleaved stream 250 of FIG. 4.

The bit-interleaved TDM stream (BI) is coupled to a TDM demultiplexer 434. The TDM demultiplexer 434 performs a standard TDM demultiplexer demultiplexing function to provide, at individual outputs, each of the N TDM demultiplexed signals 1, 2, 3 and 4. The output signals provided by the TDM demultiplexer 434 are coupled to respective network output ports (not shown).

It should be noted that the "1 to 4" TDM demultiplexer function of TDM demux 434 is not the only TDM demultiplexer function available. Specifically, in various optional embodiments, a "1 to 3" TDM demultiplexer 435, a "1 to 2" TDM demultiplexer 436 or a "1 to 1" TDM multiplexer 437 may be used. Other TDM demultiplexers known to those skilled in the art may also be employed. Broadly speaking, any TDM demultiplexer between a "1 to 1" TDM demultiplexer and a "1 to N" TDM multiplexer may be used, and such use is contemplated by the inventors. Moreover, a plurality of TDM demultiplexers may be used.

It is noted that each of the TDM demultiplexers 434 through 437 are capable of separating the N channels into 1 to N discrete or independent electrical signals to be supplied directly to the output ports of the network. Therefore, using the bit interleaved TDM demultiplexing function, up to N discrete channels may be recovered.

In one embodiment, the electronic circuitry forming the TDM demultiplexer (434, 435, 436 or 437) is adjusted such that an end user or network port may be provided with any discrete bandwidth between f and N×f (i.e., mod–f). This dynamic reconfiguration of bandwidth may be provided within the set of N channels without any alteration of the optical hardware. In one embodiment of the receiver 400, where full fine channel optical demultiplexing is desirable, a fine optical demultiplexing element may be added to the receiver in place of the photodetector 432 (to finally demux one channel within a single group of channels) or in place of the photodetector 432 and coarse optical passive demultiplexer 410 (to finely demultiplex any channel within each of the received groups). It is, of course, unnecessary to change any functionality within the transmitter.

FIG. 5 depicts a high level block diagram of an embodiment of a transmitter suitable for use in the system of FIG. 1. Specifically, the transmitter 500 of FIG. 5 comprises a chirped pulse WDM (CPWDM) transmission system that processes N communication channels to provide an output signal suitable for distribution via a fiber distribution network (e.g., fiber network 120).

In each of the bandwidth filtered CPWDM transmitters 510, the output of a short pulsed laser is chirped, creating a broad bandwidth optical signal whose wavelengths are dispersed in time, as described in more detail in (commonly assigned to Lucent Technologies Inc. of Murray Hill, N.J.) U.S. patent application Ser. No. 09/482,809, filed on Jan. 13, 2000, which is incorporated herein by reference in its entirety. The invention advantageously utilizes the time domain characteristics inherent in the chirped pulse transmission system such that multiplexing complexity may be reduced. It is noted that return-to-zero (RZ) modulation is preferably used.

The transmitter 500 of FIG. 5 differs from the transmitter 300 described above with respect to FIG. 3. Importantly, it is noted that in the transmitter 500 of FIG. 5 only N minus 1 delay elements are required, regardless of the number of groups to be transmitted. By contrast, the transmitter 300 of FIG. 3 requires N minus 1 delay elements for each group to be transmitted. This is a substantial savings in terms of cost and complexity. The transmitter 500 of FIG. 5 operates by utilizing N CPWDM modulation elements, where each modulation element passes a base WDM channel and every Nth WDM channel thereafter. In the exemplary embodiment of FIG. 5, where N equals 4, each group comprises four WDM channels spaced one quarter of a period T apart.

The first CPWDM bandwidth filtered transmitter processes a $\lambda_1$, $\lambda_5$, $\lambda_9$ and so on WDM channels up to a $\lambda_m$ WDM channel. The WDM channel processed by the first CPWDM bandwidth filter transmitter $501_1$ are coupled directly to a passive combiner 530 as a signal A.

A second bandwidth filter transmitter $510_2$ processes a second $\lambda_2$, sixth $\lambda_6$ and so on up to an M+1 $\lambda_{M+1}$ channel. The output of the second bandwidth filter transmitter $510_2$ is coupled to a delay element $520_1$ which imparts a delay of $$\frac{T}{2}$$

if the resulting delayed stream is coupled to the passive combiner 530.

The third bandwidth filter transmitter $510_3$ processes the third $\lambda_3$, seventh $\lambda_7$ and so on WDM channels every fourth WDM channel up to a $\lambda_{M+3}$ WDM channel. The output of the third bandwidth filter transmitter SW3 is coupled to a second delay element $520_2$ which imparts a $$\frac{3T}{4}$$

delay to the received signal. The resulting delayed signal C is coupled to the passive combiner 530.

The fourth bandwidth filter transmitter $510_4$ processes a fourth $\lambda_4$, eighth $\lambda_8$ and so on WDM channels up to a WDM channel $\lambda_{M+4}$. The output of the fourth $510_4$ bandwidth filter transmitter is coupled to a third delay element $520_3$, which imparts a $$\frac{T}{4}$$

delay to the received signal. The resulting delayed signal D is coupled to the passive combiner 530.

The passive combiner 530 combines each of the signals ABCD to produce an output signal A, B, C, D that is coupled to the fiber distribution network 120.

The transmission system 500 of FIG. 5 comprises four bandwidth filtered CPWDM transmitters $510_1$ through $510_4$ (collectively bandwidth filtered transmitters 510), three delay elements $520_1$ through $520_3$ (collectively delay elements 520) and a passive combiner 530.

Figure 6:
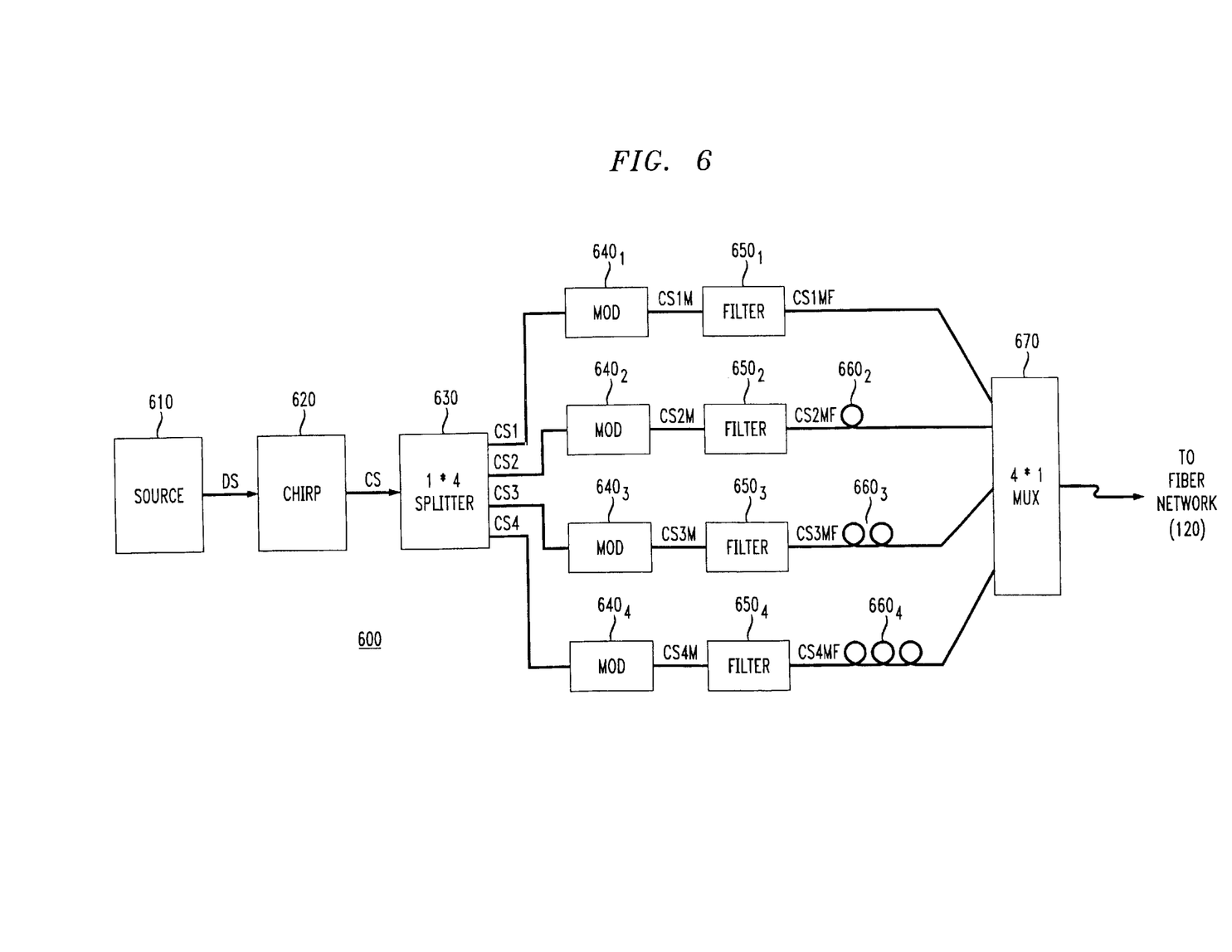
FIG. 6 depicts a high level block diagram of an embodiment of a transmitter suitable for use in the system of FIG. 1.

FIG. 6 depicts a high level block diagram of an embodiment of a transmitter suitable for use in the system of FIG. 1. Specifically, FIG. 6 depicts a high level block diagram of a transmitter 600 comprising a high speed data source 610, a chirp module 620, a "1 to 4" splitter module 630, four modulators $640_1$ through $640_4$ (collectively modulators 640), four filters $650_1$ through $650_4$ (collectively filters 650), three fiber delay loops $660_2$ through $660_4$ (collectively fiber delay loops 660) and a "4 to 1" combiner or multiplexer 670.

The data source 610 comprises, illustratively, a 50 Gbits/sec data source. The output of a pulsed laser 610 is coupled to the chirp module 620, which responsively uses the chirping techniques described above with respect to FIG. 5 to create a broad bandwidth optical signal having wavelengths dispersed in time. This broad bandwidth broadband optical signal comprises, illustratively, 1,000 wave division multiplex (WDM) channels each operating at 50 Mbits/sec such that the 50 Gbits/sec data stream provided by the source 610 may be communicated.

It is noted that each of the one thousand (1,000) WDM channels operates at a bit rate equal to the repetition rate of a pulsed laser signal 610 providing signal to the chirp module 620. If one were to look at the signal produced by the chirp module 620 through an optical filter that passed only one of these wavelength channels, the signal would look like a low duty cycle return-to-zero (RZ) modulated data stream. If one were to look at this signal without any wavelength filtering, the signal would appear as a much higher speed non-return-to-zero (NRZ) modulated data stream. Thus, the signal produced by the chirp module 620 simultaneously exhibits wave division multiplexing and time division multiplexing characteristics.

The "1 to 4" splitter 630 splits the chirped signal CS into four signals $CS_1$, $CS_2$, $CS_3$ and $CS_4$. Each of the four split chirped signals $CS_1$ through $CS_4$ is coupled to a respective modulator $640_1$ through $640_4$. In one embodiment, the splitter 630 filters the chirped signals $CS_1$ through $CS_4$ such that each chirped signal occupies a respective spectral region. In this manner, the filters 650 may be more easily realized or removed. Each modulator 640 is the first functional element on a respective "arm" comprises a modulator 640 and a filter 650. Each of the modulators 640 comprises an NRZ modulator operating to modulate respective wavelength channels with, illustratively 40 GHz spacing to produce respective modulated signals $CS_1M$, $CS_2M$, $CS_3M$ and $CS_4M$. Each of the modulated signals produced by the modulator 640 is filtered by a respective filter 650, such as a three GHz bandwidth fabry perot filter. The fabry perot filters (or other topology filters) operate to band-limit the respective received signals. For example, assuming 1,000 WDM channels, each of the filters 650 operates to produce a respective filtered and modulated chirped signal comprising 250 WDM channels. The filter wavelengths in each arm are selected to be staggered by approximately 10 GHz such that when the resulting signals are combined by the "4 to 1" mux 670, they create separate wavelength channels with approximately 10 GHz spacing. It is noted that adjacent wavelength channels also occupy approximately adjacent time channels in the transmission.

The output of the four filters 650 is respectively staggered in time using the fiber delay loops 660. Specifically, the output of the first filter $660_1$ is coupled directly to the "4 to 1" mux 670. The output of the second filter $650_2$ is coupled to the "4 to 1" mux 670 via a $$\frac{T}{4}$$

fiber delay loop $660_2$. The output of the third filter $650_3$ is coupled to the "4 to 1" mux 670 via a $$\frac{T}{2}$$

fiber delay loop $660_3$. The output of the fourth filter $650_4$ is coupled to the "4 to 1" mux 670 via a $$\frac{3T}{4}$$

fiber delay loop $660_4$. In this manner, the temporal staggering or spacing discussed above with respect to the various figures is employed such that a time division multiplexing of the WDM channels is provided.

The above-described transmitter of FIG. 6 (and those of FIGS. 3 and 5) advantageously allow a receiver to provide final stage demultiplexing in either the wavelength domain or the time domain. Time domain demultiplexing is far more cost effective because TDM demultiplexing circuits operating in the several hundred megabit per second range are readily available at relatively low cost.

It will be appreciated by those skilled in the art that FIG. 6 may be modified to include more or different modulators 640, more or different filters 650 and the like. Specifically, the inventors contemplate that the modifications discussed above with respect to the various figures may also be applied to the transmitter 600 of FIG. 6.

In one embodiment, the filters 650 of the transmitter 600 of FIG. 6 are eliminated from each arm of the transmitter, effectively eliminating the fine wavelength spacing in favor of a four fold bit rate increase in the wavelength channels (i.e., a 4× reduction in the number of wavelength channels). However, by utilizing the filters 650, a clear upgrade path for a transmission system employing the present invention is provided such that capacity may be scaled up without replacing existing transmission or reception equipment. In this manner, customers purchasing bandwidth allocations may be provided with bandwidth allocations of differing sizes, thereby enhancing customer satisfaction and promoting efficient utilization of available bandwidth.

Figure 7A:
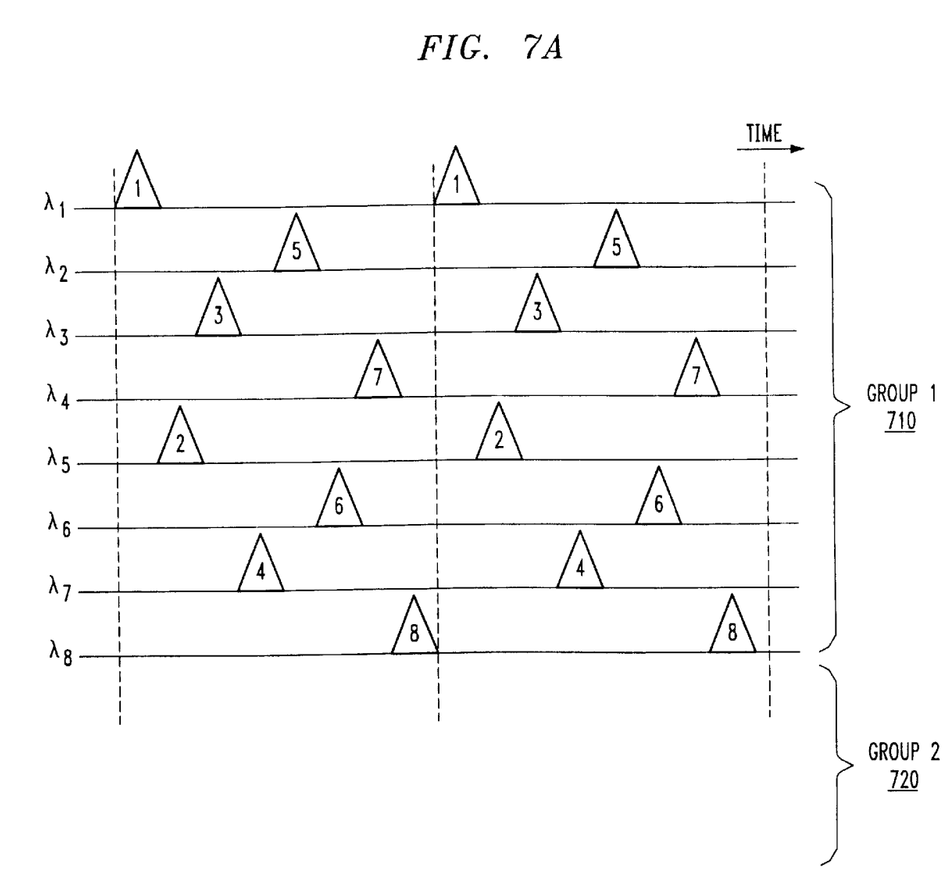
FIG. 7 depicts a graphical representation useful in understanding the present invention.
Figure 7B:
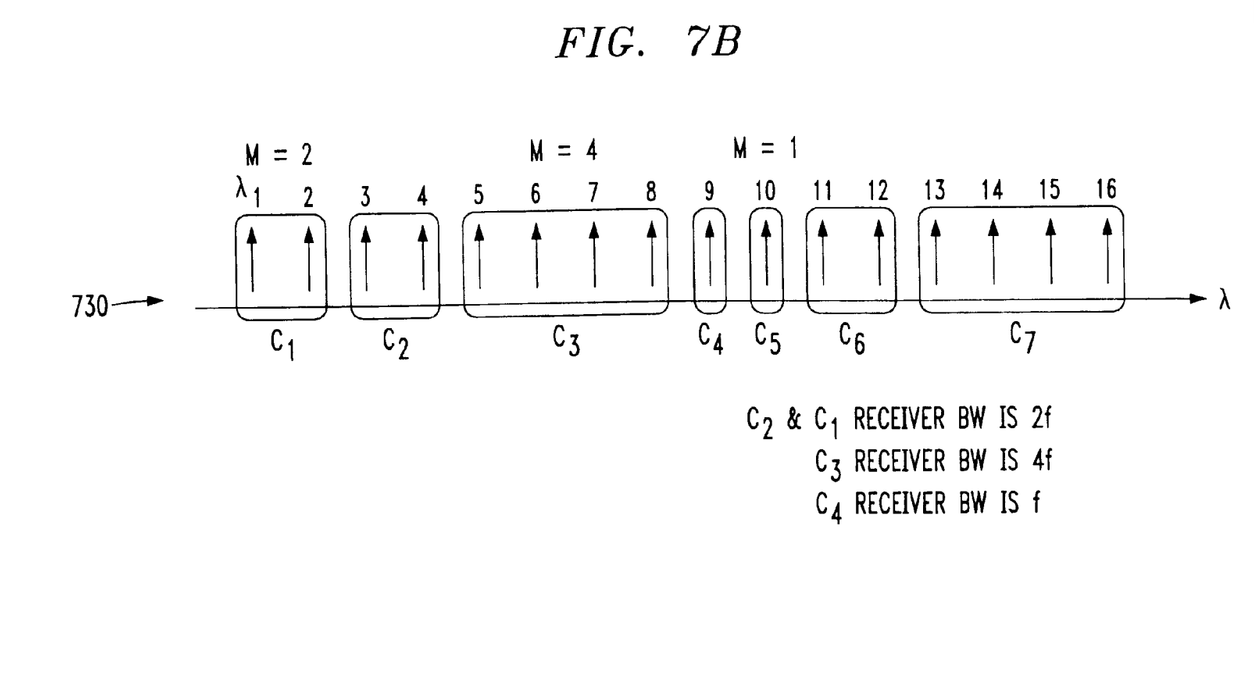

FIG. 7 depicts a graphical representation useful in understanding an application of the present invention. Specifically, FIG. 7 depicts the temporal location of data on 16 WDM channels comprising two groups of WDM channels. A first group 710 comprises WDM channels $\lambda_1$ through $\lambda_8$, while a second group 720 (not shown) comprises WDM channels $\lambda_9$ through $\lambda_{16}$. Thus, each group includes WDM channels having bit positions temporally spaced by $$\frac{T}{M},$$

illustratively $$\frac{T}{8}.$$

It is noted that the optical filters employed in the receiver determine M and the necessary receiver bandwidth, though excess receiver bandwidth may be provided.

FIG. 7 also depicts a bit-interleaved or combined stream 730 comprising the temporal summation of the various bit positions associated with the WDM channels $\lambda_1$ through $\lambda_8$ forming the first group of WDM channels 710.

It is assumed that a receiver processing the first group of WDM channels 710 allocates the bandwidth associated with these channels to four customers, denoted as C1, C2, C3 and C4. Specifically, the first customer C1 is allocated the bit positions associated with the $\lambda_1$ and $\lambda_2$ WDM channels. The second customer C2 is allocated the bit positions associated with the $\lambda_3$ through $\lambda_5$ WDM channels. The third customer C3 is allocated the bit positions associated with the $\lambda_6$ WDM channel. The fourth customer C4 is allocated the bit positions associated with the $\lambda_7$ and $\lambda_8$ WDM channels. In this manner, bandwidth requirements for individual customers may be scaled as multiples of the bit-position carrying capacity associated with individual WDM channels.

It is noted that for customers C1 and C2, M equals 2 and the receiver bandwidths are equal 2f; for customer C3, M equals 4 and the receiver bandwidth is 4f; for customers C4 and C5, M equals 1 and their respective receiver bandwidths are f; for customer C6, M equals 2 and the receiver bandwidth is 2f, and for customer C7 M equals 4 and the receiver bandwidth is 4f. In this manner, electronic TDM demultiplexing for at least customers 3 and 7 (where M equals 4) may be performed. Also, it is noted that In the example discussed above with respect to FIG. 6, where one thousand WDM channels are divided into 125 groups with eight channels in a group, each of the bit positions associated with a WDM channel is capable of a channel data rate of 50 Mbits/sec. Therefore, applying this example to FIG. 7, C1 has been allocated 100 Mbits/sec, C2 has been allocated 100 Mbits/sec, C3 has been allocated 200 Mbits/sec and C4 has been allocated 50 Mbits/sec. These allocations may be readily adapted to the changing bandwidth needs of customers. For example, increased allocations of bit positions for one particular customer may be made until a single customer controls the entire group bandwidth (i.e., 400 Mbits/sec in this example). Customers may be migrated between different groups and between different bit positions within the same group. It is preferable to have a plurality of contiguous bit positions within a group for those customers requiring such bandwidth. It will be appreciated by those skilled in the art that the invention scales very wall in both a temporal and WDM channel manner.

It will be appreciated that any channel within a group of channels, rather than the first channel as shown above, may be the channel not subjected to delay. Moreover, while providing a single non-delayed channel avoids the use of a delay element, the invention may be practiced with a delay element associated with each channel.

Although various embodiments which incorporate the teachings of the present invention have been shown and described in detail herein, those skilled in the art can readily devise many other varied embodiments that still incorporate these teachings.

What is claimed is:

1. Apparatus, comprising:

N modulators, for modulating N data streams onto respective wave division multiplex (WDM) channels to form a group of WDM channels, said WDM channels having a spacing of $\Delta\lambda$, where N is an integer;

at least N−1 delay elements, for delaying respective WDM channels such that each adjacent WDM channel is temporally offset from an adjacent channel by an integer multiple of $$\frac{1}{Nf},$$

where f is the maximum bitrate of said N data streams; and a combiner, for combining said temporally offset WDM channels.

2. The apparatus of claim 1, wherein:

each of a plurality of WDM channel groups is formed using respective groupings of N modulators and respective groupings of N−1 delay elements, said plurality of WDM channel groups occupying different spectral positions.

3. The apparatus of claim 1, wherein said modulators comprise return-to-zero (RZ) modulators.

4. The apparatus of claim 1, wherein said delay elements comprise fiberoptic delay loops.

5. The apparatus of claim 1, further comprising:

a laser module, for producing a broad bandwidth optical signal representing a plurality of WDM channel; and a splitter, for coupling at least a portion of said broad bandwidth optical signal to each of said N modulators.

6. The apparatus of claim 5, wherein said splitter provides common WDM channels to each of said modulators, said apparatus further comprising:

N filters, each of said N filters cooperating with a respective modulator to limit the spectral region of the modulator output signal.

7. The apparatus of claim 6, wherein said filters comprise fabry perot filters.

8. The apparatus of claim 5, wherein said splitter provides a respective portion of said broad bandwidth optical signal to each of said N modulators.

9. Apparatus for processing a signal including a plurality of wave division multiplex (WDM) channel groups, each of said WDM channel groups comprising N data streams modulated onto N respective WDM channels having a spacing of $\Delta\lambda$, each WDM channel being temporally offset from an adjacent WDM channel by an integer multiple of $$\frac{1}{Nf},$$

where N is an integer and f is the maximum bitrate of said N data streams, said apparatus comprising:

an optical demultiplexer, for extracting at least one WDM channel group from said signal;

a detector, for receiving said extracted WDM channel group and responsively providing a bit-interleaved time division multiplex (TDM) stream including N respective data streams; and an electronic demultiplexer, for demultiplexing at least one of said N respective data streams from said bit-interleaved TDM stream.

10. The apparatus of claim 9, wherein:

said demultiplexer demultiplexes at least one data stream for each of a plurality of customers.

11. The apparatus of claim 10, wherein a customer is selectively allocated between one and N data streams.

12. The apparatus of claim 11, wherein said detector has an optical passband (BW) equal to N multiplied by $\Delta\lambda$, and said customer allocation is realized by adapting said passband of said detector.

13. The apparatus of claim 11, wherein said customer allocation is realized by adapting the number of bit-interleaved data streams provided via respective communications paths to each customer by said demultiplexer.

14. The apparatus of claim 9, wherein said optical demultiplexer comprises a course optical demultiplexer.

15. A method, comprising the steps of:

generating M wave division multiplex (WDM) channels being spaced by $\Delta\lambda$, where M is an integer;

grouping said WDM channels into at least one channel group comprising N WDM channels, each adjacent WDM channel in said at least one channel group being temporally offset from an adjacent channel by an integer multiple of $$\frac{1}{Nf},$$

where f is the maximum bitrate of said WDM channels and N is an integer; and combining, into an output signal, said N WDM channels forming said at least one channel group.

16. The method of claim 15, wherein at least two groups comprising N WDM channels are formed.

17. The method of claim 15, wherein for each group of N WDM channels said step of generating comprises the step of:

modulating a respective data stream onto each of N WDM channels of a respective optical signal, said N WDM channels being spaced by $\Delta\lambda$.

18. The method of claim 15, wherein one channel of each group of WDM channels is not subjected to a temporal offset.

19. The method of claim 18, wherein said modulators comprise return-to-zero (RZ) modulators.

20. The method of claim 17, wherein said optical signal is generated according to the step of:

chirping a pulsed optical source to produce an optical signal including at least spectral components corresponding to said N WDM channels.

21. The method of claim 20, wherein said optical signal is generated according to the further step of:

filtering said optical signal to exclude from said step of modulation WDM channel spectra not associated with said N WDM channels of said WDM channel group.

22. The method of claim 21, wherein said step of filtering is performed after said step of modulating.

23. The method of claim 21, wherein said step of filtering is performed before said step of modulating.

24. The method of claim 21, wherein said step of filtering is performed using fabry perot filters.

25. Method for processing a signal including a plurality of wave division multiplex (WDM) channel groups, each of said WDM channel groups comprising N data streams modulated onto N respective WDM channels having a spacing of Δλ, each WDM channel being temporally offset from an adjacent WDM channel by an integer multiple of $$\frac{1}{Nf},$$

where N is an integer and f is the maximum bitrate of said N data streams, said method comprising the steps of:

extracting, using an optical demultiplexer, at least one WDM channel group from said signal;

converting, using an optical to electrical detector, said extracted WDM channel group to a bit-interleaved time division multiplex (TDM) stream including N respective data streams; and demultiplexing at least one of said N respective data streams from said bit-interleaved TDM stream.

26. The apparatus of claim 25, wherein:

said demultiplexer demultiplexes at least one data stream for each of a plurality of customers.

27. The apparatus of claim 26, wherein a customer is selectively allocated between one and N data streams.

28. The apparatus of claim 27, wherein said detector has an optical passband (BW) equal to N multiplied by Δλ, and said customer allocation is realized by adapting said passband of said detector.

29. The apparatus of claim 27, wherein said customer allocation is realized by adapting the number of bit-interleaved data streams provided via respective communications paths to each customer by said demultiplexer.

30. The apparatus of claim 25, wherein said optical demultiplexer comprises a course optical demultiplexer.

31. A computer readable medium having computer executable instructions for performing steps comprising:

generating M wave division multiplex (WDM) channels being spaced by Δλ, where M is an integer;

grouping said WDM channels into at least one channel group comprising N WDM channels, each adjacent WDM channel in said at least one channel group being temporally offset from an adjacent channel by an integer multiple of $$\frac{1}{Nf},$$

where f is the maximum bitrate of said WDM channels and N is an integer; and combining, into an output signal, said N WDM channels forming said at least one channel group.

* * * * *